May 23, 1961
G. R. JESSEN
2,984,886
PIPE DRESSING AND GROOVING TOOL
Filed Oct. 31, 1958
2 Sheets-Sheet 1
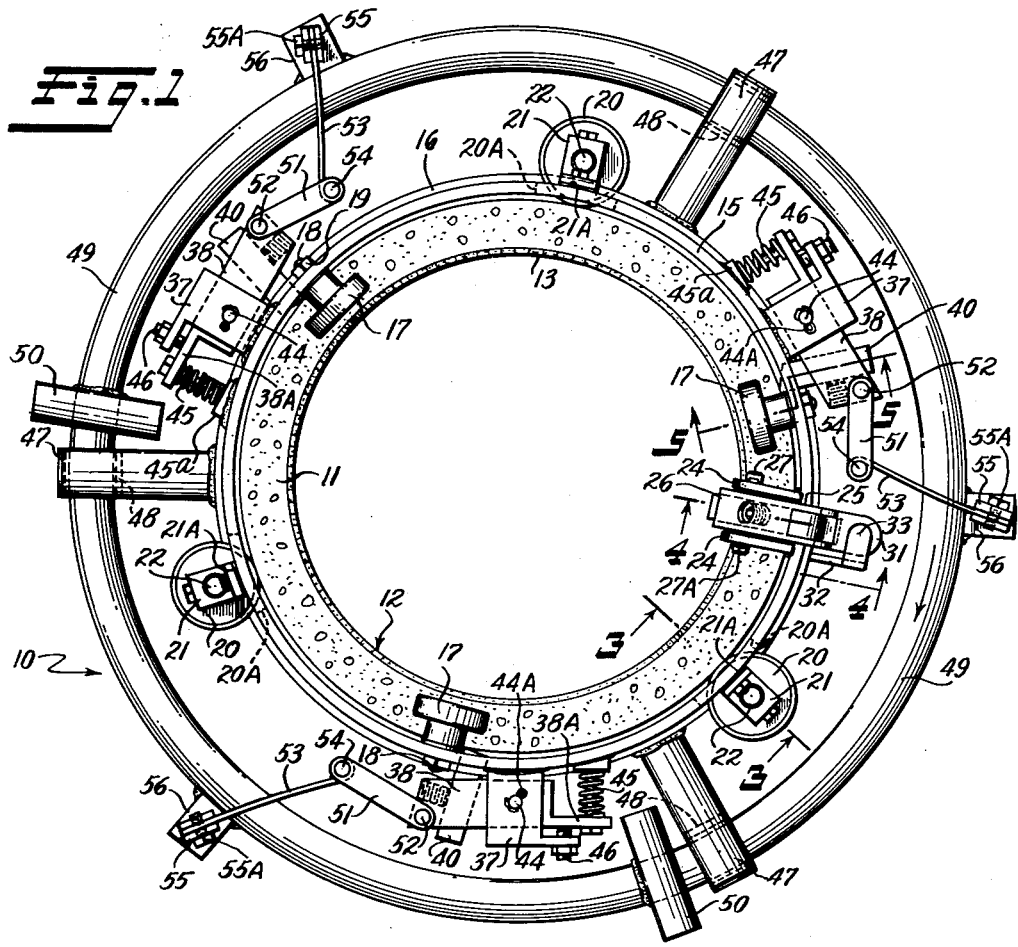
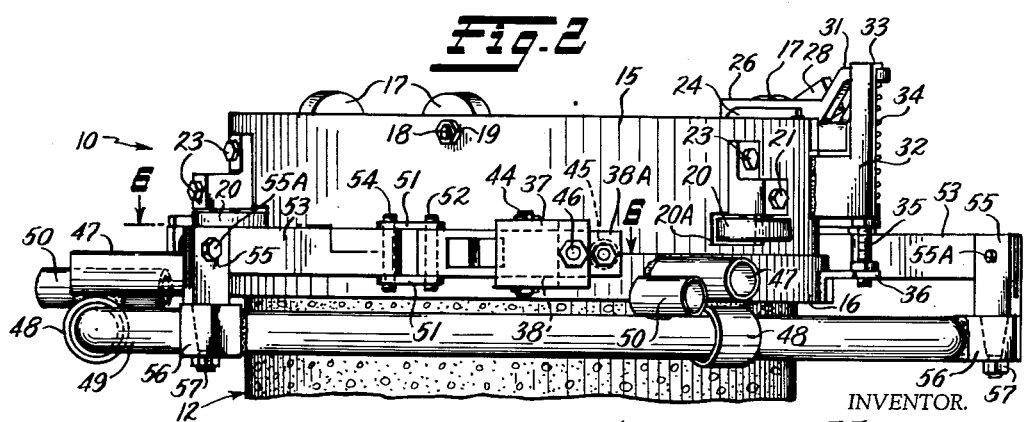
INVENTOR.
George Ronald Jessen
BY
Bacon & Thomas
ATTORNEYS

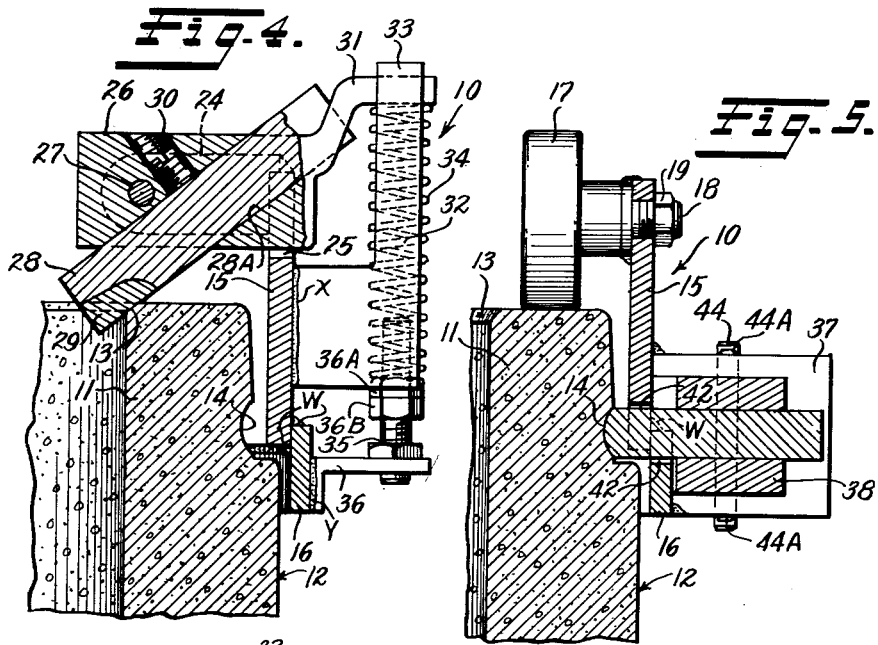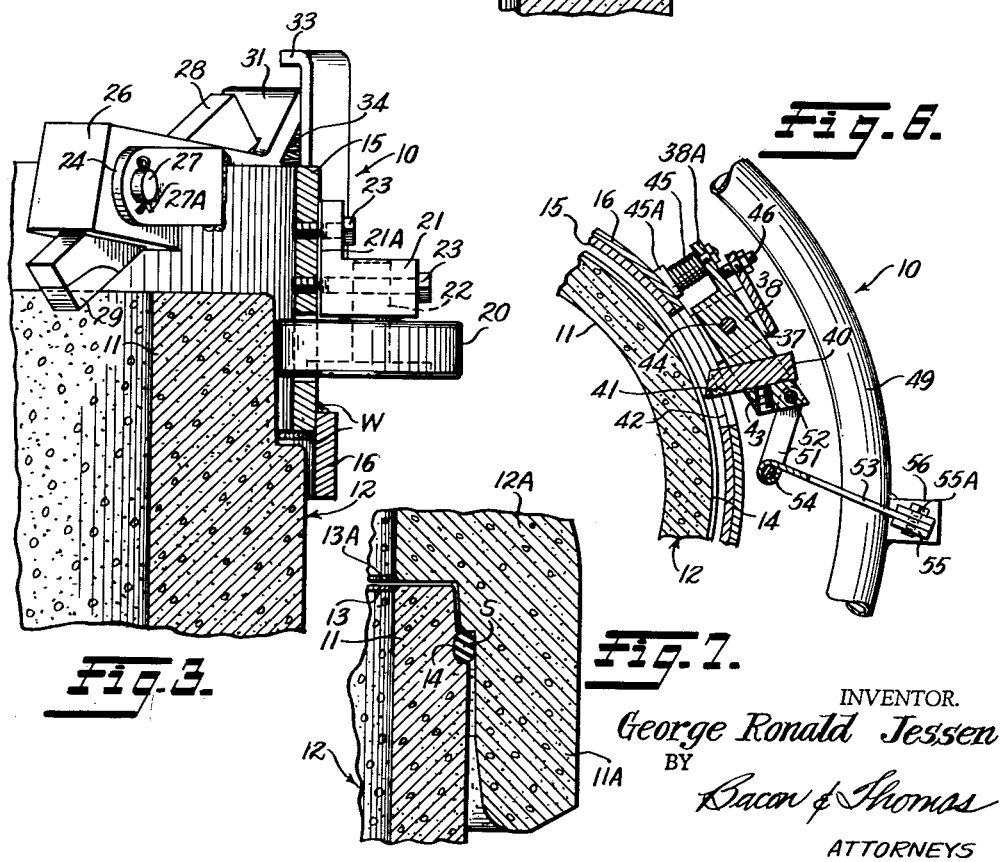

_United States Patent Office_

2,984,886
Patented May 23, 1961

2,984,886
PIPE DRESSING AND GROOVING TOOL
George Ronald Jessen, 708 S. 13th E., Salt Lake City, Utah
Filed Oct. 31, 1958, Ser. No. 771,157
16 Claims. (Cl. 25—1)

This invention relates to a manually operable tool for performing certain operations on the end of a concrete pipe or conduit and, more particularly, to a simple and efficient tool for beveling the inner edge of the pipe and/or grooving the exterior end portion of a pipe to receive a rubber sealing ring.

In the manufacture of pipes, such as those made of concrete, formed in suitable molds, it has been found that objectionable rough edges remain after removal of the forms, particularly on the inside corner or edge. It is desirable to trim or remove these rough edges or corners by chamfering in order to insure a better joint between adjoining pipe ends and to promote unimpeded fluid flow through the pipe. The smoothing of such rough edges is termed "dressing."

In order to provide a fluid-tight seal between the spigot and bell ends of adjacent pipe sections, a sealing ring is placed at the joint between the pipe sections. The sealing ring is usually carried in a groove on the outer surface of the spigot end of the pipe. It is important that this groove be properly located and that the groove provide a smooth seat of the correct diameter and cross-sectional radius to insure a uniform seating area to hold the ring in place during the assembly of the pipe sections and to properly seal the joint.

In accordance with the present invention, the chamfering and grooving of the spigot end of the pipe are preferably done while the pipe is still "green," i.e., before it has been cured to harden the same and develop its maximum strength. In this way, the groove can be held to very close tolerances.

It is the principal object of this invention, therefore, to provide a readily portable tool having metallic cutters, abrading stones, or other material removing elements, which may readily be positioned over the upturned end of a pipe, and which tool, when rotated, can be utilized to simultaneously dress the inner edge and cut a sealing ring groove in the exterior surface of the pipe in an expeditious and efficient manner.

Another object is to provide a tool that can be positioned on the end of an upright pipe and rotated to automatically bevel the inner edge of the pipe to a predetermined extent.

Another object is to provide a tool that can be positioned on the end of an upright pipe and rotated to automatically form a groove of predetermined depth in the outer surface of the pipe.

Another object is to provide a tool that can be positioned on the end of a pipe and rotated to automatically and simultaneously bevel the inner edge of the pipe and form a groove of predetermined depth in the outer surface of the pipe.

It is another object to provide a pipe dressing and grooving tool having cutters that may readily be positioned over an upturned end of a pipe, and which tool is provided with a plurality of end rollers for engaging the end face of the pipe to support the weight of the tool on the pipe, and which has additional side rollers for engaging the outer surface of the pipe to retain the cutters in their proper concentric position relative to the pipe while the tool is being rotated.

Another object is to provide a portable, pipe dresser and groover of the general character referred to having a novel groove cutter holder in which the radially inward working pressure on the cutter is automatically decreased as the resistance to cutting increases, and vice versa, whereby a substantially uniform working effort on the part of the tool operator is required.

Another object is to provide a pipe groover of the general character referred to having a ring handle, or hand wheel, which has a limited rotary movement relative to the frame of the groover, and connections between the ring handle and the groove cutter holders which tend to decrease the depth of cut of the cutters as the work resistance increases, and vice versa.

Another object is to provide a pipe dressing and grooving tool adapted to be positioned over the upturned spigot end of a pipe, the tool having a frame carrying a plurality of pivoted tool holders adapted to have a groove cutter carried thereby resiliently urged into contact with the outer surface of the pipe to produce a groove therein, and including a ring handle having limited rotative movement relative to said frame with connections between the ring handle and cutter holders, whereby limited relative movement between the ring handle and frame in one direction will retract the cutters to permit the positioning of the tool over the spigot end of the pipe, and movement of both the ring handle and frame in the opposite direction will actuate the cutters to produce a material removing operation on the pipe; and wherein relative limited movement between the ring handle and said frame in said firstmentioned direction will retract the cutters and permit the tool to be removed from the pipe.

Another object is to provide a pipe dressing and grooving tool adapted to be positioned over the upturned end of a pipe, the tool being provided with a chamfer cutter for automatically beveling the inner edge of the pipe and at least one groove cutter for automatically grooving the exterior of the pipe simultaneously with the chamfering operation, whereby the chamfering and grooving operations can be done in a minimum of time.

The foregoing objects and features of the invention will be apparent from the following detailed description taken in conjunction with the accompanying drawings in which:

Fig. 1 is a plan view showing the pipe dressing and grooving tool positioned on the spigot end of a concrete pipe;

Fg. 2 is an elevational view of the tool and pipe shown in Fig. 1;

Fig. 3 is an enlarged fragmentary sectional view taken on the line 3—3 of Fig. 1, showing one of the side rollers and the dressing or chamfering tool in elevation and prior to beveling of the inner edge of the pipe;

Fig. 4 is an enlarged fragmentary sectional view taken on the line 4—4 of Fig. 1, showing the pipe chamfered and grooved;

Fig. 5 is an enlarged fragmentary sectional view taken on the line 5—5 of Fig. 1, showing one of the groove cutters and one of the end rollers;

Fig. 6 is a fragmentary horizontal sectional view taken on the line 6—6 of Fig. 2, showing one of the groove cutters and the holder therefor; and Fig. 7 is a fragmentary vertical sectional view through a pipe joint comprising a chamfered and grooved pipe section and showing a sealing ring in the groove of the grooved pipe section.

In the description which follows hereinafter, the combined dressing and grooving tool is described in connection with a concrete pipe. It is to be understood that the tool can be employed for pipes made from other materials, and that abrading-type chamfering and grooving elements may be used in place of the cutters shown, if desired.

The operations described hereinafter are preferably performed on the concrete pipe while it is "green," as it is much easier to trim or groove before it has been hardened by curing or seasoning. However, it will be apparent that the present tool can be employed on a cured or seasoned concrete pipe, but its operation would not be as expeditious as on a "green" pipe.

Referring to Figs. 1 and 2, the grooving and dressing tool in its entirety is indicated by the reference numeral 10, and is shown in its operative position mounted on the spigot end 11 of a concrete pipe 12. It will be noted that the spigot end is slightly tapered to facilitate assembly with a mating pipe section.

The tool 10 comprises a main frame 15 made up of a supporting member in the form of a cylindrical or annular sleeve, adapted to surround, in spaced relation, the spigot end 11 of the pipe 12, and a skirt 16, which forms an enlarged downwardly extending continuation thereof. The upper end of the frame 15 carries a plurality of end rollers 17 on the inner side thereof, which rollers are each supported by a horizontal stub shaft 18 passing through the frame 15 at circumferentially spaced points 120° apart and held in place by a retaining nut 19. The skirt 16 has an inner diameter equal to the outer diameter of frame 15. The skirt and frame are mounted in telescoping relation and made integral by welding at W, as shown in Figs. 3, 4, and 5. This structure permits the dead weight of the frame 15 and that of the chamfer and groove cutting elements (to be described hereinafter), which are mounted thereon, to be supported by the end rollers 17 resting on the upper end face of the pipe.

Frame 15 also carries a plurality of side rollers 20, Figs. 1 and 3, supported by vertically extending stub shafts 22 carried by stepped brackets 21 circumferentially spaced 120° apart and staggered relative to the end rollers 17. The brackets 21 are secured to the frame 15 by a pair of bolts 23 arranged one above the other. One of the bolts 23 passes through a bore in the shaft 22 to secure said shaft against axial movement in the bracket 21. Slots 20A are provided in the frame 15 through which extend the side rollers 20 to engage the outer surface of the spigot end 11, as shown in Fig. 3. One or more shims 21A may be inserted between the brackets 21 and frame 15, as required to eliminate excess clearance between the rollers 20 and the spigot end 11, and thus assure close concentricity of the tool 10 with the pipe 12.

The end rollers 17 and the side rollers 20, because of their engagement with the end wall and side wall, respectively, of the spigot end 11 of the pipe 12, provide mountings which support the frame 15 for rotary movement relative to the pipe 12, and further serve to accurately position the chamfer cutter and the groove cutters with respect to the pipe, as will be described more fully hereinafter.

The edge dresser or chamfer cutter for trimming the inner corner or edge of the pipe 12 is shown in detail in Figs. 3 and 4. Thus, a pair of spaced arms 24 are welded to the upper end portion of the frame 15 and extend radially inwardly therefrom. These arms are mounted upon opposite sides of a slot 25 in the upper edge of the frame 15, and through which slot extends a holder 26 for a chamfering tool 28. The holder 26 is pivotally supported by a pin 27 extending through aligned openings in the arms 24 and tool holder 26, respectively. Cotter pins 27A are provided at each end of the pin 27 to prevent axial movement thereof. The chamfer cutter 28 is received in the slot 28A in the holder 26 and is held in any desired adjusted position by a set screw 30; is disposed on an angle of about 45° to the horizontal; and is preferably provided with a carbide tip 29 which, when the tool 10 is rotated, chamfers or trims the inner edge of the pipe, as shown at 13 in Fig. 4. The outer end of holder 26 has an upward and out-turned extension 31, which is spring pressed into abutting relation with a stop 33 to limit the dressing action of chamfer cutter 28. As is best shown in Fig. 4, the stop 33 is formed integral with a vertical bracket 32 welded at X to the outer surface of frame 15, the stop 33 being bent at right angles to the bracket 32. The extension 31 on the holder 26 is urged by a compression spring 34 toward the stop 33. The spring 34 is retained in place by a stud bolt 35 having its lower end threaded into a bracket 36, said bracket being mounted on the skirt 16 as by welding at Y. The force exerted on the extension 31 by the spring 34 can be varied by adjusting a nut 36A on the stud bolt 35, and retaining said nut in adjusted position by a cooperating lock nut 36B.

While only one chamfer cutter 28 is provided, it will be understood that any suitable number can be mounted on the frame 15. On the other hand, three groove cutters, spaced 120° apart, are mounted on the frame 15 and skirt 16 by brackets 37. These brackets are U-shaped, as is clearly shown in Fig. 5. A holder 38 is pivotally supported within each bracket 37 by a vertical pin 44. Cotter pins 44A at the ends of the pins 44 prevent axial displacement thereof relative to the brackets. One end of each holder 38 has an extension 38A (Fig. 6) against which a spring 45 acts to urge rotation of the holder 38 in a clockwise direction, as viewed in Fig. 6. The opposite end of spring 45 bears against an abutment 45A on skirt 16. Each holder 38 has a slot to receive a groove cutter 40, and each of the brackets 37 carries a screw 46 that can be adjusted to limit the clockwise movement of the holder 38 and thereby limit the cutting depth of the groove cutters 40. The working ends of the groove cutters 40 have a carbide tip 41, and pass through slots 42 in the frame 15 and skirt 16 for engagement with the outer surface of the spigot end 11. A set screw 43 in each holder 38 holds the groove cutter 40 in adjusted position. It will thus be seen that the springs 45 constantly urge the groove cutters 40 into cutting relation with the outer surface of the pipe. The strength of the springs 45 is sufficient to initiate groove cutting action by these cutters when the tool 10 is in position for use.

In order to effect manual rotation of the frame 15, together with its chamfering tool 28 and groove cutters 40, relative to a pipe, three radially extending guides or hangers 47, spaced 120° apart, are welded at their inner end to the skirt 16, as shown in Figs. 1 and 2. A guide ring 48 is welded to each hanger 47 at the lower side thereof and receives and serves as a guide for a manually operable ring handle or hand wheel 49. Two grips 50 are welded to the upper surface of the hand wheel 49, spaced slightly clockwise from two of the hangers 47, for a purpose to be explained later.

A pair of links 51 is attached at one end thereof to the leading end of each groove cutter holder 38. The opposite end of the links 51 is pivotally connected to a flat spring 53, said spring having a loop at one end thereof. A pin 54 extends through the opposite end of the links 51 and through said loop for pivotally connecting the same together. The other end of each spring 53 is rigidly secured to a slotted post 55 by a bolt 55A. Each post 55 has a tapered and threaded end that is mounted in a block 56 welded to the outer periphery of the hand wheel 49, a nut 57 retaining the post 55 in the block 56.

From an inspection of Fig. 1, it will be observed that the pins 52 lie radially outwardly of a theoretical straight line extending through the axis of the pins 44 and 54. This construction forms a toggle mechanism, whereby any pulling force along said straight line will cause the pins 52 to move radially inwardly tending to align themselves with the pins 44 and 54. The purpose of this construction will be explained hereinafter.

In order to chamfer and groove the spigot end 11 of the pipe 12, said end is upturned, as shown in Fig. 2, to receive the tool 10. Prior to mounting the tool 10 upon the pipe 12, the operator squeezes the grips 50 toward the adjacent hangers 47, with his hands, thereby producing a limited counterclockwise movement of the hand wheel 49 relative to the hangers 47. This movement will cause the flat springs 53 and links 51 to rotate the holders 38 clockwise about the pins 44 against the action of the springs 45 and thereby swing the groove cutters 40 outwardly to facilitate the positioning of the frame 15 about the spigot end of the pipe without damaging the pipe by said cutters. The tool 10 is then lowered onto the spigot end 11 of the pipe 12 until the end rollers 17 engage the upper end face of the pipe and the side rollers 20 engage the outer surface of said spigot end to hold the tool 10 concentric with the pipe. As the chamfer cutter 28 initially engages the end of the pipe, it will cause the holder 26 to pivot clockwise about the pin 27 forcing the extension 31 to compress the spring 34, so that said spring then yieldably urges the cutting tip 29 into cutting contact with the inner edge of the pipe.

The operator next releases his hold on the hand grips 50 and adjacent hangers 47 and then grasps the hand wheel 49 to rotate the same in a clockwise direction, as shown by the arrow in Fig. 1. The release of the hand grips 50 and the hangers 47 permits the springs 45 to act on the holders 38 and urge the groove cutters 40 into cutting contact with the outer surface of the spigot end of the pipe. Turning effort applied to the hand wheel 49 is transmitted to the frame 15 through the springs 53, links 51, holders 38 and brackets 37. Thus, rotation of the hand wheel 49 will produce rotation of the frame 15 and all of the cutters carried thereby, as a unit.

Circumferential movement of the chamfer cutter 28 relative to the pipe 12 will dress or bevel the inner edge of the pipe, as indicated at 13, to an extent permitted by the extension 31 and stop 33, it being understood that the spring 34 automatically and continually urges the cutter 28 into engagement with the pipe until the desired degree of chamfering has been accomplished. Simultaneously, the flat springs 53 will act on the cutter carrying end of the holders 38 to supplement the pressure of the springs 45 and cause said holders to pivot in a clockwise direction about the pins 44, with the result that the groove cutters 40 all start to cut the groove 14 in the pipe. So long as a turning effort is applied to the hand wheel 49, the toggle action effected by the flat springs 53 and links 51 will urge the groove cutters 40 toward the pipe 12, since the toggle action produces a component tending to urge the cutters into deeper penetration with the outer surface of the pipe. Should the resistance offered by the pipe to the cutters 40 increase abnormally, the flat springs 53 will flex clockwise, causing pins 54 to move farther away from the frame 15. This action will more nearly line up the pins 54, 52, and 44, thereby reducing the depth of cut and lessening the force of the component tending to urge the groove cutters 40 into cutting penetration with the pipe.

From the foregoing, it will be obvious that the flat springs 53 and their associated toggle mechanisms provide a force that not only causes rotary movement between the groove cutters 40 and the spigot end 11 of the pipe 12, but also provide a force which decreases the cutting penetration as the resistance to cutting abnormally increases, and increases the cutting penetration as the resistance to cutting action decreases.

The angle of the flat springs 53 relative to a radial line passing through the axis of the pipe 12 may be increased or decreased to vary the positive, radial inward cutting force produced by the toggle mechanism, by loosening the nuts 57 and changing the angle of the post 55 relative to the blocks 56. Thus, if the posts 55 are adjusted to move the flat springs 53 to position the pins 54 closer to the frame 15, the cutting pressure is increased; whereas, adjusting the posts 55 to position the pins 54 farther away from the frame 15 will reduce the cutting pressure. When the flat springs 53 have been moved to the desired adjusted position, the nuts 57 are tightened.

In using the tool 10, the hand wheel 49 is rotated in a clockwise direction until the chamfer cutter 28 reaches its limit of movement toward the end of the pipe, as preset by the stop 33, to produce the desired chamfer 13. Meanwhile, the groove cutters 40 normally will have cut groove 14 to the depth preset by the adjusting screws 46. After the chamfering and grooving operations have been completed, the operator squeezes grips 50 and hangers 47 together again to produce a limited clockwise movement of hand wheel 49 relative to the frame 15 to thereby retract the groove cutters 40 from the groove 14 and permit the tool 10 to be lifted from the end of the pipe 12 without marring the pipe. Thus, the chamfering and grooving operations are simultaneously and quickly performed.

Sealing rings used in concrete pipe joints are stretched during mounting upon the tapered spigot end of the pipe. Therefore, the groove 14 may be cut to any desired depth sufficient to retain the ring in place and prevent its inherent resilience from reacting with the tapered surface of the pipe and dislodging the ring from the pipe.

Fig. 7 is a fragmentary cross-sectional view of a pipe joint showing the spigot end 11 of the pipe 12 assembled with the bell end 11A of another pipe section 12A. As is here shown, a rubber sealing ring S is disposed in the groove 14 to form a seal between the pipe sections 12 and 12a. It will be understood that the sealing ring S is of the O-ring type and that it has been shown distorted from a true circular cross-section to form a tight seal and to be accommodated in the space at the joint between the two pipe sections.

It will be clear from the foregoing that a tool embodying the principles of the present invention may be readily constructed to chamfer the inner edge of the bell end 11A of the pipe section 12A, as indicated at 13A, Fig. 7, to provide unobstructed flow through the pipe.

Although a single embodiment of the pipe dressing and grooving tool has been illustrated and described herein, it will be understood that various changes may be made in the details of construction and in the arrangement of the parts thereof, without departing from the principles of the invention or the scope of the annexed claims.

I claim:

1. A tool for performing an operation upon an end portion of a cylindrical pipe having an end face, comprising: an annular frame; a first series of roller means arranged in a circle and adapted to engage the end face of an upended pipe, said roller means having radially disposed shafts carried by said frame for supporting the weight of said frame on said pipe for free rotation; a second circular series of roller means supported on shafts arranged in a circle and carried by said frame, said second series of roller means being adapted to engage an outer side wall of the pipe to retain said frame in concentric spaced relation surrounding said pipe; and means carried by said frame for removing a surface portion of said pipe upon relative rotation between said tool and pipe.

2. A tool as defined in claim 1, in which the means for removing a surface portion of the pipe is a chamfer element for chamfering the inner edge of said pipe.

3. A tool as defined in claim 1, in which the means for removing a surface portion of the pipe is a grooving element for grooving the outer surface of the pipe.

4. A tool as defined in claim 2 in which the chamfer element is yieldably mounted on the frame and is continuously urged into operative chamfering position, and wherein the means for removing a surface portion of the pipe also includes a grooving element for grooving the outer surface of the pipe simultaneously with the formation of said chamfer.

5. A tool for performing an operation upon an end portion of a cylindrical pipe as defined in claim 1, including a series of radially disposed members carried by said frame, and a manually operable ring supported by the outer ends of said members to rotate said tool.

6. A pipe chamfering tool, comprising: an annular frame adapted to be positioned around one end of an upended cylindrical pipe having an end face; a hand wheel; means operatively connecting said hand wheel in concentric spaced relation with said frame; roller means arranged in a circle, said roller means having radially disposed shafts carried by said frame, said roller means adapted to contact the end face of said pipe for rotatably supporting said frame on said one end of said pipe; and a chamfering element pivotally mounted upon said frame for engagement with the inner edge of said pipe; and means for resiliently urging said chamfering element into contact with said inner edge of said pipe to chamfer said edge upon manual rotation of said hand wheel and frame relative to said pipe.

7. A pipe chamfering tool as defined in claim 6, wherein the means carried by the frame for contacting the end face of the pipe comprises a plurality of rollers.

8. A pipe chamfering tool, comprising: an annular frame for surrounding the end of a pipe to be chamfered; a plurality of end rollers mounted in said frame for rotation about horizontal axes and being engageable with the end face of said pipe; a plurality of side rollers mounted upon said frame for rotation about vertical axes and being engageable with the outer surface of said pipe; and means carried by said frame for forming a chamfer at the inner edge of said end of said pipe upon rotation of said frame relative to said pipe.

9. A pipe grooving tool, comprising: an annular frame for surrounding the end of a pipe to be grooved; a plurality of end rollers mounted in said frame for rotation about horizontal axes and being engageable with the end face of said pipe for supporting the weight of said tool on said pipe; a plurality of side rollers mounted upon said frame for rotation about vertical axes and being engageable with the outer surface of said pipe to maintain said tool concentric with said pipe; and means carried by said frame for forming a groove in said pipe upon rotation of said frame relative to said pipe.

10. A pipe grooving tool, comprising: an annular frame; a plurality of guides spaced circumferentially about said frame; a hand wheel supported by said guides for circumferential movement relative to said frame; means carried by said frame for rotatably and concentrically supporting said frame and hand wheel on one end of a pipe; grooving means pivotally mounted upon said frame for forming a groove in the exterior surface of said pipe; and connecting means between said hand wheel and said pivotally mounted grooving means operable upon manual movement of said hand wheel in one circumferential direction relative to said frame to retract said grooving means and operable upon movement of said hand wheel in the opposite circumferential direction to advance said grooving means.

11. A pipe grooving tool as defined in claim 10, in which a grip member is mounted on the hand wheel in normally spaced relation to one of the guides and wherein the grip member can be squeezed toward said one guide to move the hand wheel in said one circumferential direction.

12. A pipe chamfering and grooving tool, comprising: a frame adapted to be positioned in spaced surrounding relation to one end of a pipe; a chamfering element carried by said frame for acting on said one end of said pipe; groove forming means carried by said frame for acting on an outer surface of said pipe; guide means carried by said frame; manually operable means supported by said guide means and movable relative to said frame; and flexible connecting means between said manually operable means and said grooving means, whereby manipulation of said manually operable means will produce movement of said frame and chamfering element and grooving means relative to the pipe.

13. A pipe chamfering and grooving tool, comprising: a frame adapted to be positioned in spaced surrounding relation to a pipe; a chamfer cutter carried by said frame for acting on said one end of said pipe, groove cutters pivotally carried by said frame for acting on an outer surface of said pipe; guide means carried by said frame; manually operable means supported by said guide means and movable relative to said frame; and toggle means connecting said manually operable means with said pivotally mounted groove cutters, whereby manipulation of the manually operable means will cause rotation of the frame and produce a force urging said pivotally mounted groove cutters into contact with the pipe.

14. A tool as defined in claim 13, in which the toggle means comprise a link, one end of which is pivotally connected with a pivotally mounted groove cutter and the other end of which is pivotally connected with a connecting member carried by said manually operable means.

15. A tool as defined in claim 14, in which the pivotal connection between the connecting member and the link lies closer to the frame than the pivotal connection between the link and pivotally mounted groove cutter.

16. A tool as defined in claim 14, in which the connecting member between the manually operable means and the link is made of resilient material.

References Cited in the file of this patent

UNITED STATES PATENTS

| | | |
|---|---|---|
| 310,706 | Merrill | Jan. 13, 1885 |
| 2,291,899 | Jones | Aug. 4, 1942 |
| 2,630,613 | Webb | Mar. 10, 1953 |
| 2,794,232 | Webb | June 4, 1957 |
| 2,795,027 | Rossier | June 11, 1957 |

FOREIGN PATENTS

| | | |
|---|---|---|
| 180,906 | Australia | Jan. 25, 1955 |
| 621,564 | Germany | Nov. 9, 1935 |